(12) United States Patent
LaPointe et al.

(10) Patent No.: US 8,662,053 B2
(45) Date of Patent: Mar. 4, 2014

(54) PRE-COMBUSTION DEVICE FOR AN INTERNAL COMBUSTION ENGINE

(75) Inventors: Leon A. LaPointe, Columbus, IN (US);
Chris L. Sanger, Columbus, IN (US);
James A. Zigan, Versailles, IN (US);
Daniel J. Mohr, Columbus, IN (US);
Laszlo D. Tikk, Columbus, IN (US)

(73) Assignee: Cummins Inc., Columbus, IN (US)

( * ) Notice: Subject to any disclaimer, the term of this patent is extended or adjusted under 35 U.S.C. 154(b) by 368 days.

(21) Appl. No.: 12/913,728

(22) Filed: Oct. 27, 2010

(65) Prior Publication Data

US 2011/0146618 A1 Jun. 23, 2011

Related U.S. Application Data

(60) Provisional application No. 61/289,127, filed on Dec. 22, 2009.

(51) Int. Cl.
*F02B 19/00* (2006.01)

(52) U.S. Cl.
USPC .............. 123/266; 123/273; 123/286

(58) Field of Classification Search
USPC .............. 123/260, 266–268, 273, 285–288
See application file for complete search history.

(56) References Cited

U.S. PATENT DOCUMENTS

| | | | | |
|---|---|---|---|---|
| 3,406,667 A | * | 10/1968 | Evans et al. | 123/267 |
| 3,710,764 A | * | 1/1973 | Jozlin | 123/266 |
| 4,248,189 A | * | 2/1981 | Barber et al. | 123/169 PA |
| 4,892,070 A | * | 1/1990 | Kuhnert | 123/274 |
| 4,930,473 A | * | 6/1990 | Dietrich | 123/266 |
| 4,987,868 A | * | 1/1991 | Richardson | 123/260 |
| 5,230,313 A | * | 7/1993 | Bisel et al. | 123/266 |
| 5,241,930 A | * | 9/1993 | Dupler | 123/169 PA |
| 5,431,140 A | | 7/1995 | Faulkner | |
| 5,533,476 A | | 7/1996 | Anderson | |
| 5,554,908 A | | 9/1996 | Kuhnert et al. | |
| 5,662,082 A | * | 9/1997 | Black et al. | 123/254 |
| 5,915,351 A | * | 6/1999 | Regueiro | 123/254 |
| 5,947,076 A | | 9/1999 | Srinivasan et al. | |
| 6,016,785 A | | 1/2000 | Divecha et al. | |
| 6,019,081 A | | 2/2000 | Divecha et al. | |

(Continued)

FOREIGN PATENT DOCUMENTS

EP 1476926 B1 2/2003

OTHER PUBLICATIONS

International Search Report and Written Opinion, PCT/US2010/061834, Cummins Inc., ISR/US, Feb. 15, 2011.
Wall, John C., Heywood, John B. The Influence of Operating Variables and Prechamber Size on Combustion in a Prechamber Stratified-Charge Engine. Society of Automotive Engineers Technical Paper Series 780966. International Fuels & Lubricants Meeting. Nov. 13-16, 1978.

(Continued)

*Primary Examiner* — Stephen K Cronin
*Assistant Examiner* — Joseph Dallo
(74) *Attorney, Agent, or Firm* — Krieg DeVault LLP

(57) ABSTRACT

An apparatus is disclosed including a first end defining an inner passage along a first inner surface of the first end, where the inner passage has threads structured to receive a spark plug. The apparatus further includes a second end opposite the first end and extending into a combustion chamber of a cylinder, the second end defining a pre-combustion chamber along a second inner surface and threads on an outer surface structured to thread into a spark plug hole in a cylinder head, which may be an enlarged spark plug hole. The second end includes holes that fluidly couple the pre-combustion chamber of the second end with the combustion chamber of the cylinder.

28 Claims, 5 Drawing Sheets

(56) References Cited

U.S. PATENT DOCUMENTS

| | | |
|---|---|---|
| 6,460,506 B1 | 10/2002 | Nevinger |
| 7,021,275 B2 | 4/2006 | Durling |
| 7,104,246 B1 * | 9/2006 | Gagliano et al. ............... 123/266 |
| 7,216,623 B2 * | 5/2007 | Teraji et al. ................... 123/256 |
| 7,438,043 B2 * | 10/2008 | Shiraishi et al. .............. 123/260 |
| 8,074,620 B2 | 12/2011 | Filipek et al. |
| 2002/0104507 A1 | 8/2002 | Riggs |
| 2005/0000484 A1 * | 1/2005 | Schultz et al. ................ 123/266 |
| 2005/0211217 A1 * | 9/2005 | Boley et al. ................... 123/266 |

OTHER PUBLICATIONS

Latsch, Reinhard. The Swirl-Chamber Spark Plug: A Means of Faster, More Uniform Energy Conversion in the Spark-Ignition Engine. SAE Technical Paper Series 840455. International Congress & Exposition, Feb. 27-Mar. 2, 1984.

Mavinahally, N.S., et al. Torch Ignition: Ideal for Lean Burn Premixed-Charge Engines. Journal of Engineering for Gas Turbines and Power. Oct. 1994, vol. 116, pp. 793-798.

* cited by examiner

PRE-COMBUSTION DEVICE FOR AN INTERNAL COMBUSTION ENGINE

RELATED APPLICATION

This application is related to, and claims the benefit of, U.S. Patent Application Ser. No. 61/289,127, entitle "Pre-Combustion Device for an Internal Combustion Engine", filed on Dec. 22, 2009, which is incorporated herein by reference.

TECHNICAL FIELD

The present application relates to internal combustion engines, and more particularly, but not exclusively relates to a pre-combustion device for spark ignition engines.

BACKGROUND

Pre-combustion devices in spark ignition engines reduce engine emissions and can improve performance by reducing the timing delay and increasing the speed of heat release. However, currently available pre-combustion devices suffer from issues relating to the retrofitting of existing engines and ignition system durability due to the high temperatures within the pre-combustion devices. Accordingly, there is a continuing demand for further contributions in this area of technology.

SUMMARY

One embodiment of the present application is a pre-combustion device for a spark ignition engine. Other embodiments include unique methods, systems, devices, and apparatus involving or relating to spark ignition engine modifications and/or emissions control. Further objects, forms, embodiments, benefits, advantages, features, and aspects of the present application shall become apparent from the description and drawings contained herein.

DETAILED DESCRIPTION

For the purposes of promoting an understanding of the principles of the invention, reference will now be made to the embodiments illustrated in the figures and specific language will be used to describe the same. It will nevertheless be understood that no limitation of the scope of the invention is thereby intended, such alterations and further modifications in the illustrated embodiments, and such further applications of the principles of the invention as illustrated therein being contemplated as would normally occur to one skilled in the art to which the invention relates.

Figure 1:
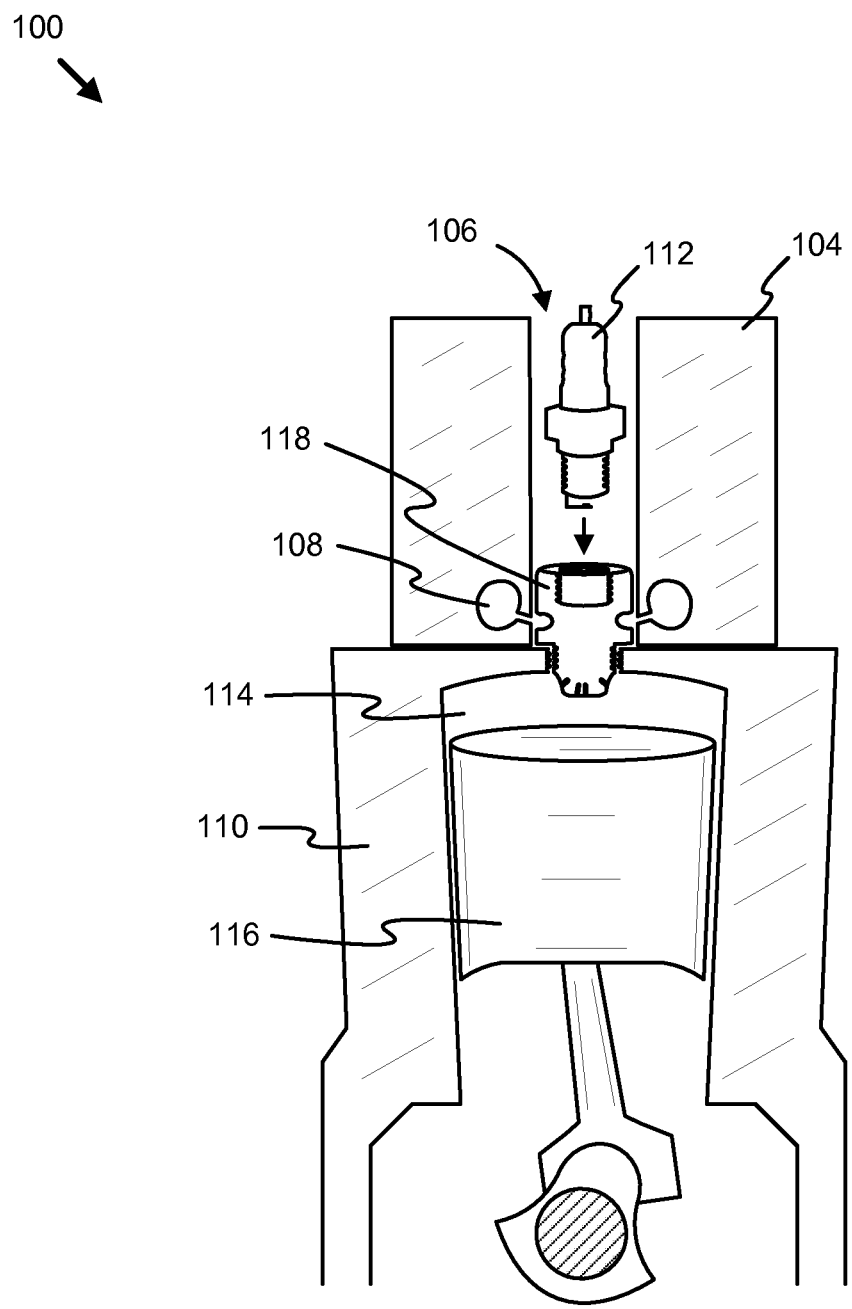
FIG. 1 is a cutaway schematic illustration of an internal combustion engine including to a pre-combustion device.

FIG. 1 is a cutaway schematic illustration of an internal combustion engine 100 including a pre-combustion device 118. The engine 100 includes a cylinder head 104 defining a spark plug passage 106 and a head cooling passage 108. The engine further includes an engine block 110 that assembles with the head cooling passage 108 to form the engine 100. In certain embodiments, the engine 100 is fueled with natural gas and/or related hydrocarbons such as methane, ethane, or propane. In certain embodiments, the engine 100 is partially fueled with natural gas, and/or is a hybrid engine using natural gas in combination with other fuels.

The cylinder head 104 may include multiple spark plug passages 106 corresponding to each of a set of multiple cylinders in the engine block 110. The spark plug passage 106 receives a spark plug 112 that ordinarily exposes the spark plug electrode to a combustion chamber 114 defined by the engine block 110 and a piston 116. In certain embodiments, a pre-combustion device 118 is positioned in the spark plug passage 106 such that the spark plug electrode is not exposed directly to the combustion chamber 114. In certain embodiments, the pre-combustion device 118 is coupled to the cylinder head 104. In certain embodiments, the pre-combustion device 118 is formed integrally with the cylinder head 104.

Figure 2:
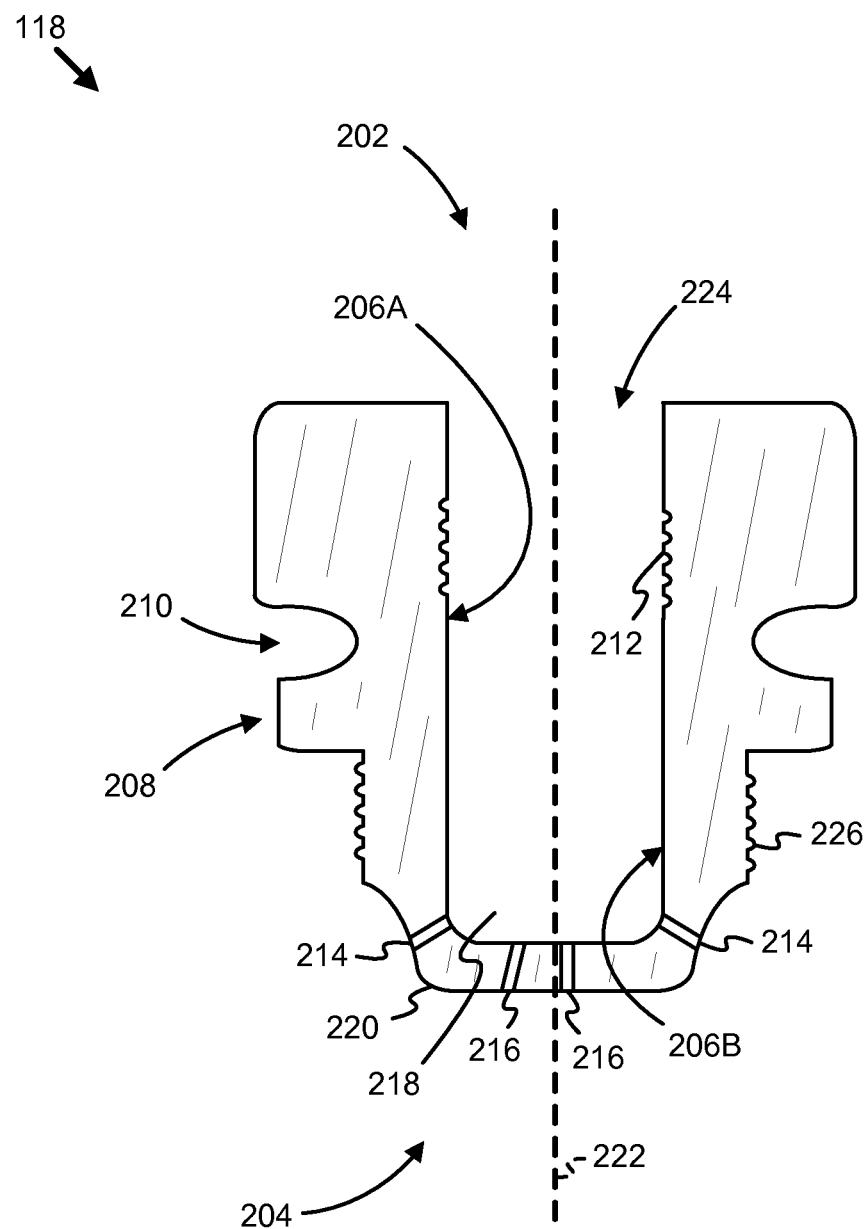
FIG. 2 is an illustration of a pre-combustion device.

Referring to FIG. 2, a pre-combustion device is illustrated. The device 118 includes a first end 202 and a second end 204. In certain embodiments, the first end 202 and the second end 204 are formed independently and secured together. In certain embodiments, the first end 202 and the second end 204 are formed integrally. The device 118 further includes an inner surface (including a first inner surface 206A and a second inner surface 206B) and an outer surface 208. In certain embodiments, the outer surface 208 defines a cooling channel 210 about the device 118. The cooling channel 210 is fluidly coupled to the head cooling passage 108. In certain embodiments, the cooling channel 210 is a channel defined by the outer surface 208 and cooperates with the spark plug passage 106 and the cylinder head 104 to define a cooling jacket around the second end 204.

The first end 202 defines an inner passage 224 along the first inner surface 206A, the inner passage 224 defining threads 212 that receive complementary sparkplug threads defined by a spark plug 112. In certain embodiments, the inner surface 206A at the first end 202 includes first end threads 212 that are operable to receive the threads of a spark plug 112. In certain embodiments, the second end 204 opposite the first end 202 includes second end threads 226 along the outer surface 208 that couple to complementary threads on the cylinder head 104. In certain embodiments, the threads on the cylinder head 104 are the original threads intended for the spark plug 112. In certain embodiments, the threads on the cylinder head 104 are threads machined on the cylinder head 104 formed by tapping a larger hole in the cylinder head 104 such that the device 118 engages a larger diameter hole than originally placed in the cylinder head 104 for the spark plug 112. In certain embodiments, the cylinder head 104 may be formed with a larger diameter hole structured for a pre-combustion device 118, and/or the cylinder head 104 may be formed integrally with a pre-combustion device 118.

The second end 204 is substantially enclosed—for example enclosed except having a fluid connection with the first end 202 and a plurality of holes 214, 216 for fuel injection into the combustion chamber 114—and the second end 204 defines a pre-combustion chamber 218. The pre-combustion chamber 218 is operable to fluidly communicate with an electrode of the spark plug 112 when the spark plug 112 is received at the first end 202. In certain embodiments, the spark plug 112 includes multiple ignition sites, or electrodes. For example, the spark plug 112 may be a standard sized and threaded sparkplug including four electrodes, and in one specific form of the present application, the spark plug is a 4-electrode spark plug manufactured by BERU AKTIENG-ESELLSCHAFT having a principal place of business at Mörikestraβe 155, D-71636 Ludwigsburg.

While the device 118 is coupled to the cylinder head 104 and the cylinder head 104 is coupled to the engine block 110, the second end 204 extends into the cylinder combustion chamber 114. The second end 204 extends into the cylinder combustion chamber 114 sufficiently such that the injection holes 214, 216 place fuel into the cylinder combustion chamber 114 without injected fluid directly hitting cylinder walls, but placed to avoid interference with the piston 116.

In certain embodiments, the second end 204 includes a plurality of holes 214 around the circumference of the second end 204. The openings 214 provide fluid coupling between the pre-combustion chamber 218 and the cylinder combustion chamber 114. In certain further embodiments, the second end 204 includes a tip 220 defining at least one tip opening 216 near a center of the tip 220. The tip opening(s) 216 may be at the center of the tip 220 or near the center of the tip 220. In certain embodiments, the spark plug 112, the spark plug passage 106, and the pre-combustion device 118 may share a common centerline longitudinal axis 222. The tip opening(s) 216 may be aligned with the centerline longitudinal axis 222, or may be aligned at an angle oblique to the centerline longitudinal axis 222. The tip opening(s) 216 provide a heat transfer environment that reduces the temperature of the tip 220 during combustion, which may prevent pre-spark detonation of fuel and may improve the reliability of the device 118. In certain embodiments, the tip opening(s) 216 are formed near a location on the tip 220 that is expected to experience the highest temperatures, for example near the center of the combustion chamber 114. In certain embodiments, the second end 204 includes at least two tip openings 216 defined along axes parallel to and near the centerline longitudinal axis 222.

Figure 3A:
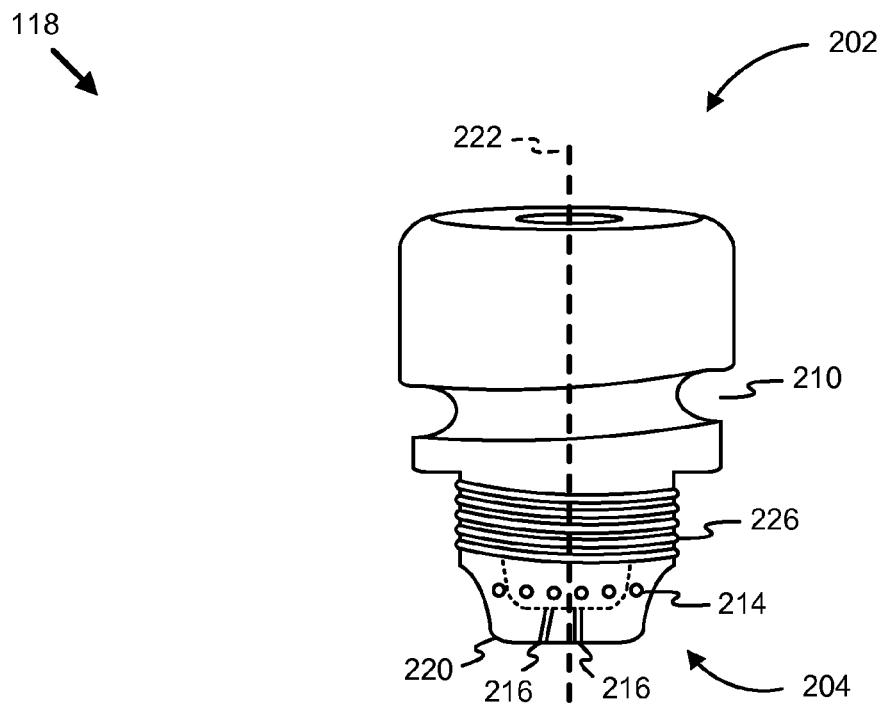
FIG. 3A is a schematic illustration of a pre-combustion device having a plurality of tip openings.
Figure 3B:
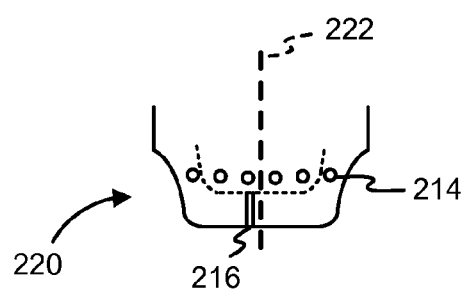
FIG. 3B is a schematic illustration of a pre-combustion device having a tip opening defined along a centered longitudinal axis.
Figure 3C:
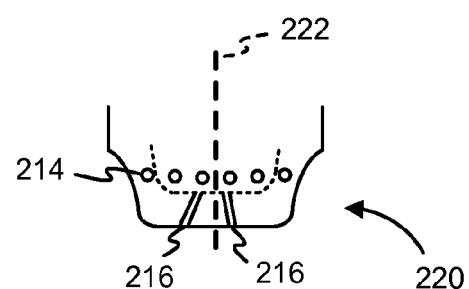
FIG. 3C is a schematic illustration of a pre-combustion device having tip openings defined along an oblique angle relative to a centerline longitudinal axis.

FIG. 3A is a schematic illustration of a pre-combustion device 118 having a plurality of tip openings 216. The tip openings 216 illustrated in FIG. 3A are near and parallel to the centerline longitudinal axis 222. FIG. 3B is a schematic illustration of a pre-combustion device 118 having a tip opening 216. The tip opening 216 is parallel to and approximately centered on the centerline longitudinal axis 222. FIG. 3C is a schematic illustration of a pre-combustion device 118 having tip openings 216. The tip openings 216 are near and oblique to the centerline longitudinal axis 222.

Figure 4:
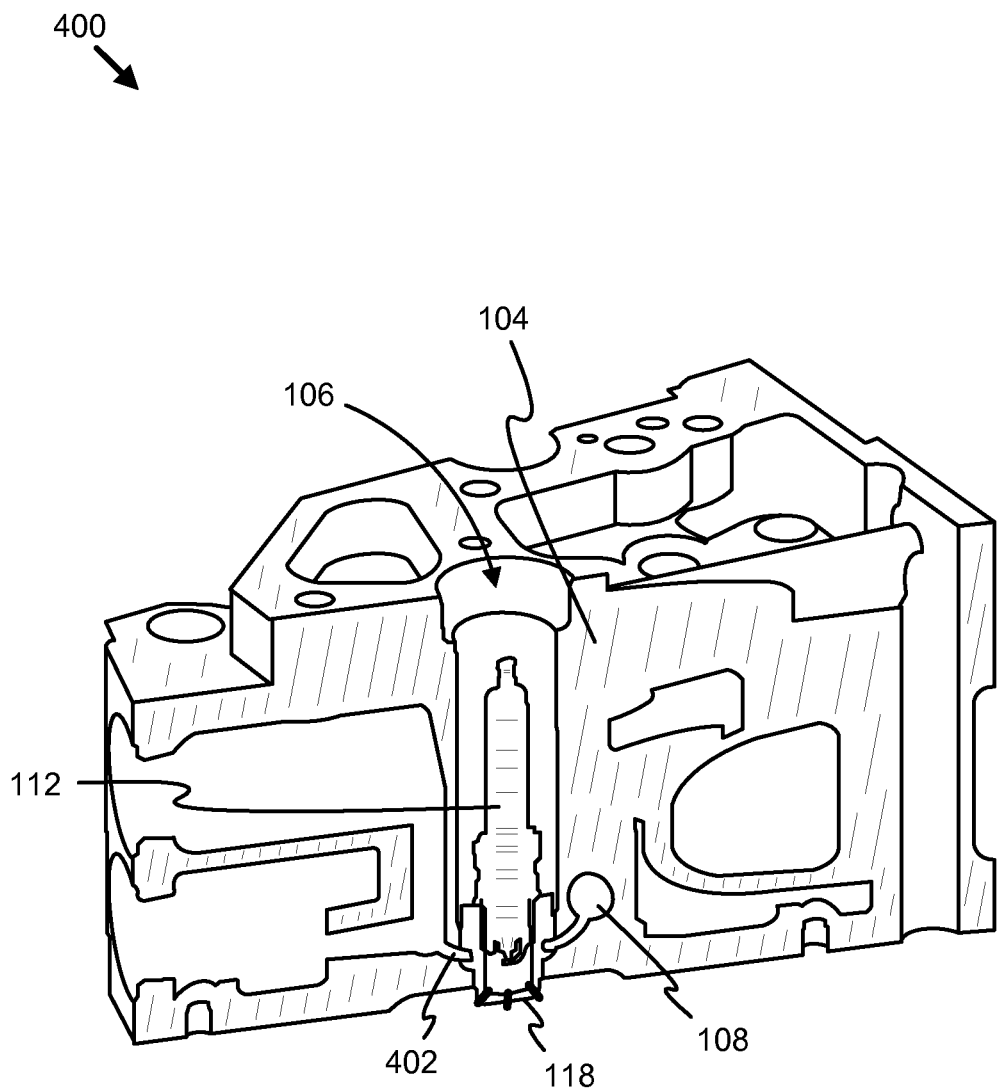
FIG. 4 is a schematic illustration of a cylinder head coupled to a pre-combustion device.

FIG. 4 is a schematic illustration of a cylinder head 104 coupled to a pre-combustion device 118. The cylinder head 104 includes a spark plug channel 106 that may be an enlarged passageway machined from a stock spark plug channel. The cylinder head 104 includes a head cooling passage 108 fluidly coupled to an enlarged passageway (the spark plug channel 106), for example by a machined channel 402 between at least a portion of the head cooling passage 108 and the enlarged passageway. In certain embodiments, the device 118 includes a cooling channel 210 defined by an outer surface 208 and operable to cooperate with the sparkplug passage 206 and the cylinder head cooling passage 108 to define a cooling jacket around the second end 204.

Figure 5:
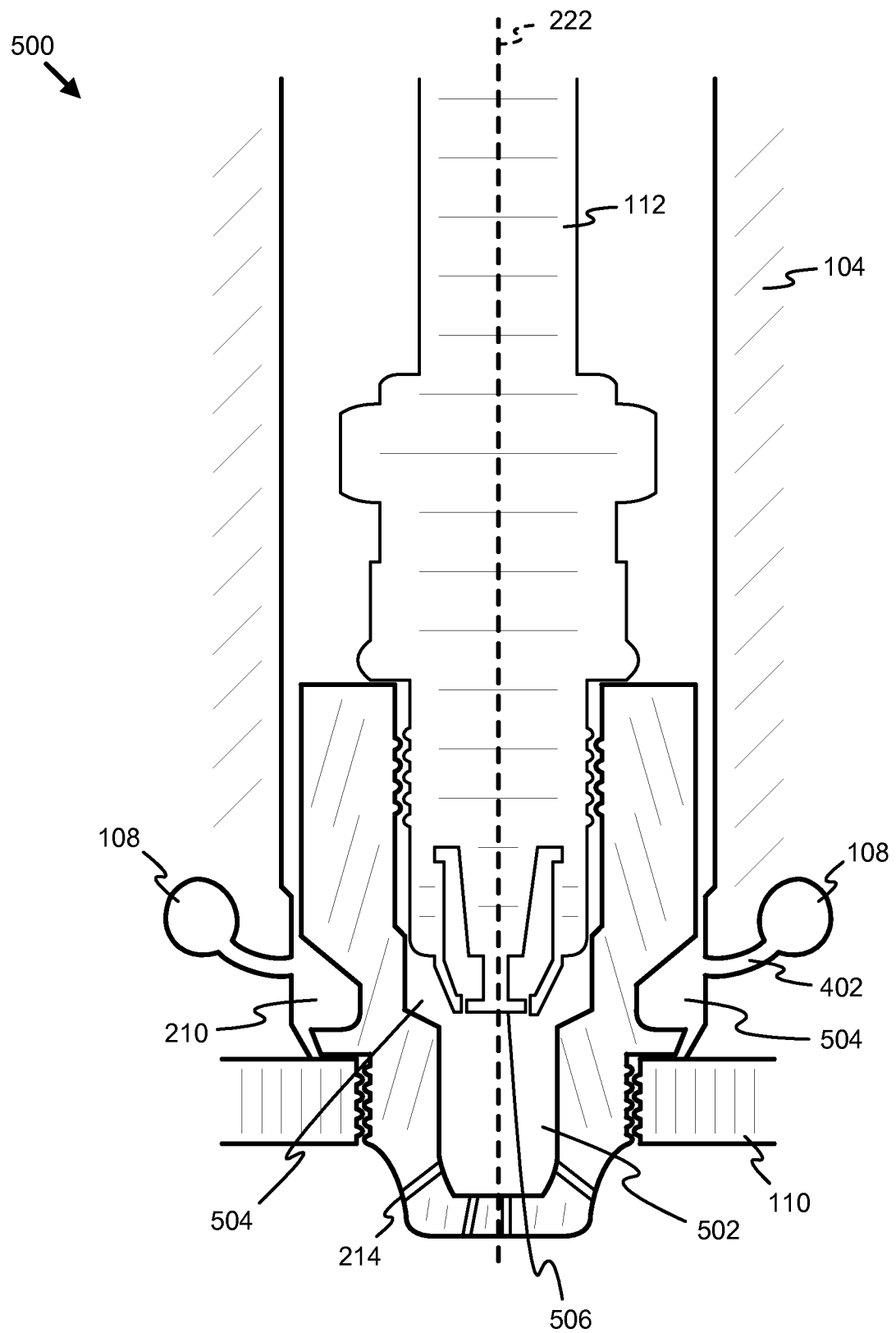
FIG. 5 is a schematic illustration of a pre-combustion device having a primary volume and a secondary volume.

FIG. 5 is a schematic illustration of a pre-combustion device 118 having a pre-combustion chamber 218 with a primary volume 502 and a secondary volume 504. The device 118 receives the spark plug 112 having an electrode 506 in the device 118 inner passage. The spark plug 112 ignites an air-fuel mixture in the primary volume 502 of the pre-combustion chamber 218, and residual ignition gas (e.g. combustion products) flow into the secondary volume 504 of the pre-combustion chamber 218 and away from the electrode 506 of the spark plug 112. The secondary volume 504 clears residual gas and combustion byproducts from the spark plug gap at the electrode 506. The spark plug 112 may be replaced periodically, for example on a maintenance schedule or as part of a repair operation. The pre-combustion device 118 may be replaced periodically, for example on a maintenance schedule or as part of a repair operation. In certain embodiments, the park plug 112 is removed and replaced after a first period of time, and the pre-combustion device 118 is removed and replaced after a second period of time.

As is evident from the figures and text presented above, a variety of embodiments according to the present invention are contemplated.

In one exemplary embodiment, a method includes providing a spark ignition engine including a cylinder head having a head cooling passage and a spark plug passage, enlarging the spark plug passage to provide an enlarged passageway, and providing a pre-combustion device. The pre-combustion device includes a first end defining an inner passage to receive a spark plug, and a second end. The second end defines a pre-combustion chamber and a plurality of circumferential holes, and an outer surface of the second end structured to engage the cylinder head. The method further includes mounting the cylinder head to an engine block and engaging the outer surface to the cylinder head. In certain embodiments, the second end extends at least partially into a combustion chamber of a cylinder in response to the outer surface engaging the cylinder head, and the plurality of circumferential holes fluidly couple the pre-combustion chamber with the combustion chamber of the cylinder.

In certain further embodiments, the pre-combustion device defines a cooling passage between the outer surface and the cylinder head in response to the engaging the outer surface to the cylinder head. In certain further embodiments, the method further includes receiving a spark plug in the inner passage, igniting a fuel and air mixture in a primary volume of the pre-combustion chamber, and receiving residual ignition gas in a secondary volume of the pre-combustion chamber. In certain embodiments, receiving residual ignition gas in the secondary volume includes flowing the residual ignition gas way from an electrode of the spark plug. In certain embodiments, the spark plug includes multiple ignition sites. In certain embodiments, enlarging of the spark plug passage includes machining threads in the enlarged passageway to receive a threads defined by the second end.

In certain embodiments, the method includes fluidly coupling at least a portion of a head cooling passage to the outer surface of the second end. In certain further embodiments, fluidly coupling at least a portion of a head cooling passage to the outer surface of the second end includes machining a cooling channel between at least a portion of the head cooling passage and the outer surface of the second end.

In an exemplary embodiment, an apparatus includes a first end defining an inner passage along a first inner surface of the first end, the inner passage defining a plurality of first portion threads operable to receive a plurality of complementary sparkplug threads defined by a sparkplug. The apparatus further includes a second end opposite the first end and extending into a combustion chamber of a cylinder, the second end defining a pre-combustion chamber along a second inner surface and a plurality of second portion threads along an outer surface of the second end operable to couple to a plurality of complementary cylinder head threads defined by the cylinder head. The second end includes a plurality of holes operable to fluidly couple the pre-combustion chamber and the combustion chamber of the cylinder.

In certain embodiments, the second end further includes a tip defining at least one tip opening near a center of the tip. In certain embodiments, the first end and the second end share a common centerline longitudinal axis. In certain further embodiments, the second end includes a tip defining at least one tip opening near a center of the tip where the at least one tip opening is defined along the centerline longitudinal axis. In certain embodiments, the second end includes a tip defining at least one tip opening near a center of the tip where the at least one tip opening is defined along an oblique angle relative to the centerline longitudinal axis. In certain embodiments, the second end includes a tip defining at least two tip openings near a center of the tip where the tip openings are defined along axes parallel to and near the centerline longitudinal axis.

In certain embodiments, an outer diameter of the first end is greater than an outer diameter of the second end. In certain embodiments, the first end and the second end are integrally formed. In certain embodiments, the apparatus includes a channel defined by the outer surface and operable to cooperate with a sparkplug passage and a cylinder head cooling passage to define a cooling jacket around the second end.

In certain exemplary embodiments, a system includes a cylinder head defining a sparkplug passage and a head cooling passage and a device positioned in the sparkplug passage and coupled to the cylinder head. The device includes a first end and a second end and having an inner surface and an outer surface, the outer surface defining a cooling channel about the device, the cooling channel being fluidly coupled to the head cooling passage, the inner surface at the first end including a plurality of first end threads operable to receive a plurality of corresponding complementary threads defined in a sparkplug, the second end being substantially enclosed and defining a pre-combustion chamber therein, the pre-combustion chamber operable for fluid communication with at least one electrode of the received sparkplug. The second end is operable to extend into a cylinder combustion chamber when the cylinder head is coupled to an engine block, and the second end includes a circumference having a plurality of openings, where the openings are operable to fluidly couple the pre-combustion chamber and the combustion chamber.

In certain embodiments, the system further includes an engine block having the cylinder combustion chamber. In certain further embodiments, the engine block includes a number of cylinder combustion chambers, and the cylinder head defines a plurality of sparkplug passages each corresponding to a different cylinder combustion chambers in the engine block. In certain embodiments, the second end further includes a tip defining at least one tip opening near a center of the tip. In certain embodiments, the sparkplug, the first end, the second end, and the sparkplug passage share a common centerline longitudinal axis. In certain embodiments, the at least one tip opening is aligned along the centerline longitudinal axis. In certain embodiments, the at least one tip opening is aligned along an oblique angle relative to the centerline longitudinal axis. In certain embodiments, the device is integrally formed with the cylinder head.

In one exemplary embodiment, a method includes operating a spark ignition engine including a cylinder head, a head cooling passage in the cylinder head, a cylinder combustion chamber, and a sparkplug passage in the cylinder head. The method further includes receiving a portion of a fuel and air mixture from the cylinder combustion chamber through a plurality of openings defined in a pre-combustion chamber of a device positioned in the sparkplug passage and coupled to the cylinder head, wherein the device further includes a first end and a second end, the first end having an inner surface and an outer surface and the second end defining the pre-combustion chamber and extending into the cylinder combustion chamber, igniting the fuel and air mixture in the pre-combustion chamber with an electrode of a spark plug coupled to the first end to create an ignited mixture, and combusting the fuel air mixture in the cylinder combustion chamber with the ignited mixture.

In certain embodiments, igniting the fuel and air mixture in the pre-combustion chamber includes igniting the fuel and air mixture in the pre-combustion chamber in a primary volume of the pre-combustion chamber, the method further including receiving residual exhaust gas after igniting the fuel and air mixture into a secondary volume defined about the sparkplug and the primary volume. In certain embodiments, the method further includes cooling the sparkplug with a cooling channel defined by the outer surface and the sparkplug passage and fluidly coupled to the head cooling passage. In certain embodiments, the method includes removing and replacing the sparkplug after a first period of time. In certain further embodiments, a plurality of complementary threads of the sparkplug are removably received by a plurality of threads defined in the first end. In certain embodiments, the method includes removing and replacing the device after a second period of time. In certain embodiments, a plurality of threads defined by the second portion are removably received by a plurality of complementary threads in the cylinder head.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
providing a natural gas-fueled spark ignition engine including a cylinder head having a head cooling passage and a spark plug passage;
enlarging the spark plug passage to provide an enlarged passageway;
providing a pre-combustion device including a first end defining an inner passage to receive a spark plug, a second end defining a pre-combustion chamber and a plurality of circumferential holes, and an outer surface structured to engage the cylinder head;
mounting the cylinder head to an engine block;
engaging the outer surface to the cylinder head, wherein the second end extends at least partially into a combustion chamber of a cylinder in response to the engaging the outer surface to the cylinder head, and wherein the plurality of circumferential holes fluidly couple the pre-combustion chamber with the combustion chamber of the cylinder;

receiving a spark plug in the inner passage;

igniting a fuel and air mixture in a primary volume of the pre-combustion chamber; and receiving residual ignition gas in a secondary volume of the pre-combustion chamber.

2. The method of claim 1, wherein the pre-combustion device defines a cooling passage between the outer surface and the cylinder head in response to the engaging the outer surface to the cylinder head.

3. The method of claim 1, wherein receiving residual ignition gas in the secondary volume comprises flowing the residual ignition gas way from an electrode of the spark plug.

4. The method of claim 1, wherein the spark plug includes multiple ignition sites.

5. The method of claim 1, wherein the enlarging of the spark plug passage includes machining a plurality of threads in the enlarged passageway to receive a plurality of complementary threads defined by the second end.

6. The method of claim 1, further comprising fluidly coupling at least a portion of a head cooling passage to the outer surface of the second end.

7. The method of claim 6, wherein the fluidly coupling at least a portion of a head cooling passage to the enlarged passageway includes machining a cooling channel between at least a portion of the head cooling passage and the outer surface of the second end.

8. An apparatus, comprising:
a first end defining an inner passage along a first inner surface of the first end, the inner passage defining a plurality of first end threads operable to receive a plurality of complementary sparkplug threads defined by a sparkplug; and
a second end opposite the first end and extending into a combustion chamber of a cylinder, the second end defining a pre-combustion chamber along a second inner surface and a plurality of second end threads along an outer surface of the second end operable to couple to a plurality of complementary cylinder head threads defined by a cylinder head;
wherein the second end includes a plurality of holes operable to fluidly couple the pre-combustion chamber and the combustion chamber of the cylinder;
wherein the pre-combustion chamber includes a primary volume proximate to the plurality of holes and a secondary volume proximate to the inner passage; and
wherein the second end further includes a tip defining at least one tip opening near a center of the tip.

9. The apparatus of claim 8, wherein the first end and the second end share a common centerline longitudinal axis.

10. The apparatus of claim 8, wherein the at least one tip opening is defined along the centerline longitudinal axis.

11. The apparatus of claim 9, wherein the at least one tip opening is defined along an oblique angle relative to the centerline longitudinal axis.

12. The apparatus of claim 9, wherein the at least one tip opening comprises at least two tip openings near the center of the tip, and wherein the tip openings are defined along axes parallel to and near the centerline longitudinal axis.

13. The apparatus of claim 8, wherein an outer diameter of the first end is greater than an outer diameter of the second end.

14. The apparatus of claim 8, wherein the combustion chamber is a chamber in a natural-gas fueled engine.

15. The apparatus of claim 8, further comprising a channel defined by the outer surface and operable to cooperate with a sparkplug passage and a cylinder head cooling passage to define a cooling jacket around the second end.

16. A system comprising:
a cylinder head defining a sparkplug passage and a head cooling passage; and
a pre-combustion device positioned in the sparkplug passage and coupled to the cylinder head, the pre-combustion device including a first end and a second end and having an inner surface and an outer surface, the outer surface defining a cooling channel about the pre-combustion device, the cooling channel being fluidly coupled to the head cooling passage, the inner surface at the first end including a plurality of first end threads operable to receive a plurality of corresponding complementary threads defined in a sparkplug, the second end being substantially enclosed and defining a pre-combustion chamber therein, the pre-combustion chamber operable for fluid communication with at least one electrode of the received sparkplug;
wherein the second end is operable to extend into a cylinder combustion chamber when the cylinder head is coupled to an engine block comprising a natural-gas fueled engine, the second end further including a circumference having a plurality of openings defined therein, wherein the plurality of openings are operable to fluidly couple the pre-combustion chamber and the combustion chamber;
wherein the cylinder head defines a plurality of sparkplug passages each corresponding to a different one of a plurality of cylinder combustion chambers in the engine block; and
wherein the pre-combustion chamber includes a secondary volume operable to receive the at least one electrode of the received sparkplug and a primary volume operable to fluidly couple the secondary volume to the plurality of openings.

17. The system of claim 16, wherein the second end further includes a tip defining at least one tip opening near a center of the tip.

18. The system of claim 17, wherein the sparkplug, the pre-combustion device, and the sparkplug passage share a common centerline longitudinal axis and wherein the at least one tip opening is aligned along one of the centerline longitudinal axis and an oblique angle relative to the centerline longitudinal axis.

19. The system of claim 16, wherein the pre-combustion device is integrally formed with the cylinder head.

20. A method comprising:
operating a natural gas-fueled spark ignition engine including a cylinder head, a head cooling passage in the cylinder head, a cylinder combustion chamber, and a sparkplug passage in the cylinder head;
receiving a portion of a fuel and air mixture from the cylinder combustion chamber through a plurality of openings defined in a pre-combustion chamber of a pre-combustion device positioned in the sparkplug passage and coupled to the cylinder head, wherein the pre-combustion device further includes a first end and a second end, the first end having an inner surface and the second end defining the pre-combustion chamber and extending into the cylinder combustion chamber and having an outer surface;
igniting the fuel and air mixture in a primary volume of the pre-combustion chamber with an electrode of a spark plug coupled to the first end to create an ignited mixture;

receiving residual exhaust gas after igniting the fuel and air mixture into a secondary volume defined about the sparkplug and the primary volume; and combusting the fuel air mixture in the cylinder combustion chamber with the ignited mixture.

21. The method of claim 20, further comprising removing and replacing the sparkplug after a first period of time, and removing and replacing the pre-combustion device after a second period of time.

22. The method of claim 20, wherein a plurality of complementary threads of the sparkplug are removably received by a plurality of threads defined in the first end and wherein a plurality of threads defined by the second end are removably received by a plurality of complementary threads in the cylinder head.

23. The method of claim 20, wherein the sparkplug passage is formed by enlarging a preexisting sparkplug channel.

24. The method of claim 20, further comprising:

forming the sparkplug passage by machining a preexisting sparkplug channel to a larger diameter;

forming threads on the cylinder head at the sparkplug passage or the preexisting sparkplug channel, the threads engaging a plurality of complementary threads defined by the pre-combustion device.

25. The apparatus of claim 8, further comprising an enlarged passageway to which at least a portion of the second end is provided;

wherein the enlarged passageway is defined by the cylinder head;

wherein the enlarged passageway comprises an enlarged sparkplug channel; and wherein the enlarged passageway defines the plurality of complementary cylinder head threads.

26. The apparatus of claim 8, wherein a maximum diameter of the primary volume is less than a maximum diameter of the secondary volume.

27. The system of claim 26, wherein a diameter of the pre-combustion chamber at an interface between the primary volume and the secondary volume is not less than the maximum diameter of the primary volume.

28. The system of claim 16, wherein the primary volume comprises a first generally cylindrical cavity of a first diameter, and the secondary volume comprises a second generally cylindrical cavity of a second diameter greater than the first diameter.

* * * * *